US006157105A

United States Patent [19]

Kuragaki et al.

[11] Patent Number: 6,157,105

[45] Date of Patent: Dec. 5, 2000

[54] STARTER

[75] Inventors: Akira Kuragaki; Shigeru Shiroyama; Koichiro Kamei; Hidekazu Katayama, all of Tokyo, Japan

[73] Assignee: Mitsubishi Denki Kabushiki Kaisha, Tokyo, Japan

[21] Appl. No.: 09/455,490

[22] Filed: Dec. 6, 1999

[30] Foreign Application Priority Data

May 27, 1999 [JP] Japan ................................ 11-147804

[51] Int. Cl.[7] ............................ H02K 7/10; H02K 11/00; H02K 49/00; H02P 15/00

[52] U.S. Cl. ............................ 310/75 R; 310/41; 310/69; 310/71; 310/98; 310/99

[58] Field of Search .................................... 310/75 R, 41, 310/70 A, 69, 71, 98, 99, 100

[56] References Cited

U.S. PATENT DOCUMENTS

| | | | |
|---|---|---|---|
| 3,232,123 | 2/1966 | Wheatley | 74/7 R |
| 3,399,576 | 9/1968 | Seilly et al. | 74/7 R |
| 4,862,027 | 8/1989 | Isozumi et al. | 310/99 |
| 5,839,318 | 11/1998 | Kimura et al. | 74/7 R |

FOREIGN PATENT DOCUMENTS

| | | |
|---|---|---|
| 7-87682 | 9/1995 | Japan . |
| 10-159692 | 6/1998 | Japan . |

*Primary Examiner*—Nestor Ramirez
*Assistant Examiner*—Guillermo Perez
*Attorney, Agent, or Firm*—Sughrue, Mion, Zinn, Macpeak & Seas, PLLC

[57] ABSTRACT

A contact shaft moving device that reduces the wearing of a pinion in a ring gear. More specifically, the contact shaft moving device moves a contact shaft in such a direction as to cause a moving contact to be in direct contact with a stationary contact after a plunger is attracted and moved for a certain period of time by an exiting coil. The movement of the plunger also assists in moving the pinion into abutment with the ring gear prior to contact between the moveable and stationary contacts.

13 Claims, 12 Drawing Sheets

STARTER

BACKGROUND OF THE INVENTION

1. Field of the Invention

The present invention relates to a starter for starting an engine.

2. Description of the Prior Art

FIG. 11 is a cross-sectional view showing one example of a conventional starter disclosed in Japanese laid-Open Patent Application (Kokai) No. Hei 10-159692.

In FIG. 11, reference numeral 1A is an output shaft. Coaxially arranged on this output shaft 1A are an electromagnetic switch 2A, an overrunning clutch 30A provided with a pinion 30P for engaging with a ring gear 50A, a plunger 40A consisting of an inner plunger 4A and an outer plunger 4B, etc. A starter with this structure is generally called a coaxial type starter.

Reference numeral 12A is an armature of a DC motor and 16A is a shaft (a motor shaft). 18A is a deceleration mechanism for decelerating the turning force of the shaft 16A and transmitting the decelerated force to the output shaft 1A. 8A is a contact shaft which is supported substantially parallel with the plunger 40A by an internal gear member 17A of the deceleration mechanism 18A through a supporting hole 17*m*.

100 is a bracket, and 800 is a shift plate for connecting the outer plunger 4B to the contact shaft 8A.

Further, the upper side of the central axis in FIG. 11 shows the state where the starter is not put in operation, and the lower side of the central axis in FIG. 11 shows the state where the starter is in operation with an electromagnetic switch turned ON and the pinion is caused to engage with the ring gear.

Operation will now be explained hereunder. Operation is explained with reference to FIG. 12 which is a partially enlarged view of FIG. 11.

When an ignition switch is turned ON and an electric current flows to an exciting coil 2B of the electromagnetic switch 2A, the outer plunger 4B is attracted by an exciting core 2C of the electromagnetic switch 2A. This conventional starter has such a structure that the outer plunger 4B is directly connected to the contact shaft 8A through the shift plate 800, and the contact shaft 8A also moves at the same time when the outer plunger 4B is attracted and moved by the exciting coil 2B. A coil spring 401 is disposed between the outer plunger 4B and the inner plunger 4A through a spring bearing member 400. The inner plunger 4A is kept in the resting state because the coil spring 401 compresses at the initial stage even if the outer plunger 4B starts the attraction movement. Disposed in front of the inner plunger 4A through a shifter member 402 is an inner clutch 30B, which is also kept in the resting state while the inner plunger 4A is kept in the resting state. After a short interval when the outer plunger 4B starts the attraction movement, a moving contact 80A mounted on the contact shaft 8A comes into contact with a stationary contact 80B disposed in a contact chamber ZA. When the moving contact 80A contacts with the stationary contact 80B, electric power is supplied from an external power source through a contact bolt 11A to start rotation of the armature 12A. When the output shaft 1A starts to turn through the deceleration mechanism 18A, the pinion 30P starts to move toward the ring gear 50A by the thrust generated in a helical spline portion 1B. Then, the crests and roots of the pinion 30P agree and engage with those of the ring gear 50A. Thereafter, when the engine starts, the output shaft 1A is disengaged from the pinion 30P by the action of the overrunning clutch 30A and the pinion 30*p* runs idle. When the power supply to the exciting coil 2B is stopped, the pinion 30P is disengaged from the ring gear 50A by return springs 403 and 404.

In the conventional starter disclosed in Japanese Laid-Open patent Application (Kokai) No. Hei 10-159692, the outer plunger 4B is directly connected to the contact shaft 8A through the shift plate 800. Since the contact shaft 8A also moves simultaneously as the outer plunger 4B is attracted and moved, the moving contact 80A immediately comes into contact with the stationary contact 80B. The armature 12A begins to rotate before the end surface 30P*e* of the pinion 30P comes into contact with the end surface 50A*e* of the ring gear 50A.

In other words, according to the above-mentioned starter, the pinion 30P is caused to rotate by driving the armature 12A before the pinion 30P engages with the ring gear 50A. However, in the above starter, the driving force by the thrust generated in the helical spline portion 1B is insufficient to press the pinion 30P toward the ring gear 50A and the coil spring 401 is also incapable of pressing the pinion 30P toward the ring gear 50A. Therefore, when engaging with the ring gear 50A, the pinion 30P is often repelled by the ring gear 50A and tries to engage with it.

Accordingly, the pinion 30P does not engage with the ring gear 50A smoothly and the reliability when the pinion 30P engages with the ring gear 50A is low. In addition, the gears are worn away and the life span of the gears is shortened.

As described above, the conventional starter has such a structure that the contact shaft moves by the same amount as the (outer) plunger does. In this case, it is necessary to secure a moving space of a plate (retaining ring etc) 9A for holding the coil spring 9S adapted to press both the contact shaft and the moving contact inside the contact chamber. As a result, the contact chamber inevitably becomes large.

Also, when the clearance between the contact shaft and the supporting portion therefor is large, the backlash is caused therebetween and affects the sliding of the contact shaft to make the contact of the moving contact with the stationary contact imperfect. It may cause contact failure. On the contrary, when the clearance is small, it may cause wearing.

SUMMARY OF THE INVENTION

It is therefore an object of the present invention to solve the above-mentioned problems and to provide a starter in which a pinion can smoothly engage with a ring gear to improve the reliability at the time of the engagement and wearing of the gear can be reduced to extend its life span, and which can be made small in size.

It is another object of the present invention to provide a starter in which the contact shaft can slide smoothly to prevent wearing, and which can make the contact of the moving contact with the stationary contact perfect (uniform).

According to the present invention, there is provided a starter comprising an output shaft driven by an electric motor; a plunger; an exciting coil for attracting the plunger; an overrunning clutch having a pinion for engaging with a ring gear and spline-connected to the output shaft; the plunger, the exciting coil and the overrunning clutch being arranged on the outer circumference of and coaxially arranged on the output shaft; a contact shaft provided on one end thereof with a moving contact for contacting with a stationary contact so that electric power can be supplied to the motor and arranged substantially parallel with the plunger; and wherein a contact shaft moving means is provided to move the contact shaft in such a direction as to cause the moving contact to engage with the stationary contact after the plunger is attracted and moved only for a certain period of time by the exciting coil.

Also, an energizing means is provided for causing the pinion to engage with the ring gear by the elastic force after an end surface of the pinion is brought into contact with an end surface of the ring gear.

The contact shaft moving means comprises a shift plate secured to the plunger and provided with a through-hole for passing the other end of the contact shaft therethrough, and a shift plate contacting portion provided on the other side of the contact shaft and arranged to contact with the shift plate when the shift plate moves only for said certain period of time as the plunger is attracted and moved, and to move the contact shaft by the movement of the shift plate as the plunger is further attracted and moved, thereby causing the moving contact to contact with the stationary contact.

Further, the energizing means comprises an elastic means arranged in a space between the inner circumference of the plunger and the outer circumference of the output shaft, a first pressure plate secured to the inner circumference of the plunger and adapted to apply pressure force to one end of the elastic means as the plunger is attracted and moved, and a second pressure plate arranged on the other end of the elastic means and adapted to transmit the elastic force stored in the elastic means as a result of pressure by the first pressure plate to the overrunning clutch, thereby causing the pinion to engage with the ring gear.

The contact shaft moving means is also arranged to cause the moving contact of the contact shaft to contact with the stationary contact after the end surface of the pinion is brought into contact with the end surface of ring gear by the energizing means as the plunger is attracted and moved only for a certain period of time.

The contact shaft is supported, through a bearing made of the different material from the contact shaft, on a supporting hole provided on an internal gear member forming the deceleration mechanism for decelerating the turning force of the shaft of the motor and transmitting the decelerated force to the output shaft, or on the outer wall member of the starter.

The above and other objects, features and advantages of the present invention will become more apparent from the following description when taken in conjunction with the accompanying drawings.

BRIEF DESCRIPTION OF THE ACCOMPANYING DRAWINGS

Figure 8:
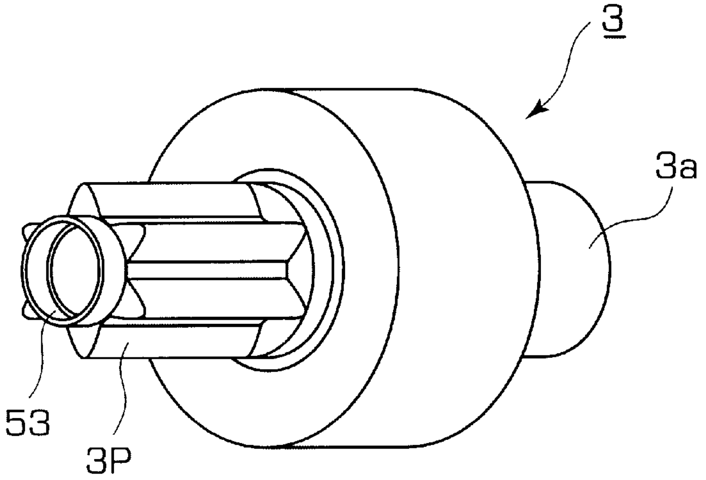
Figure 8:
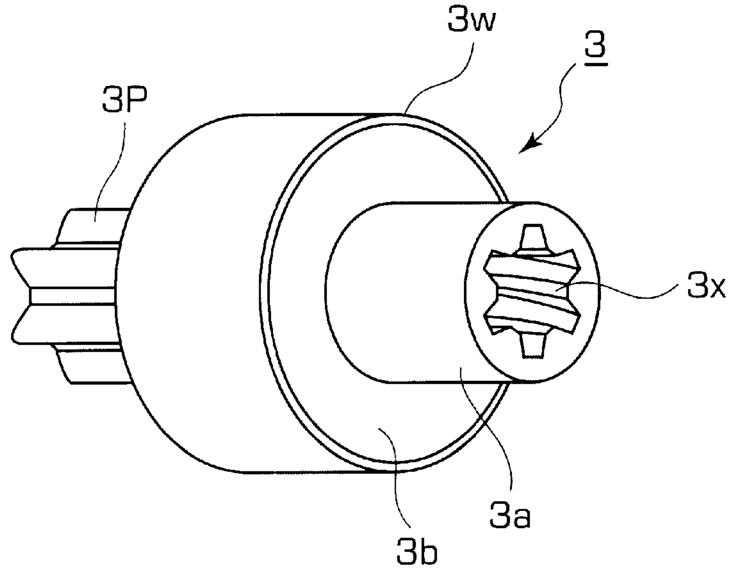
Figure 9:
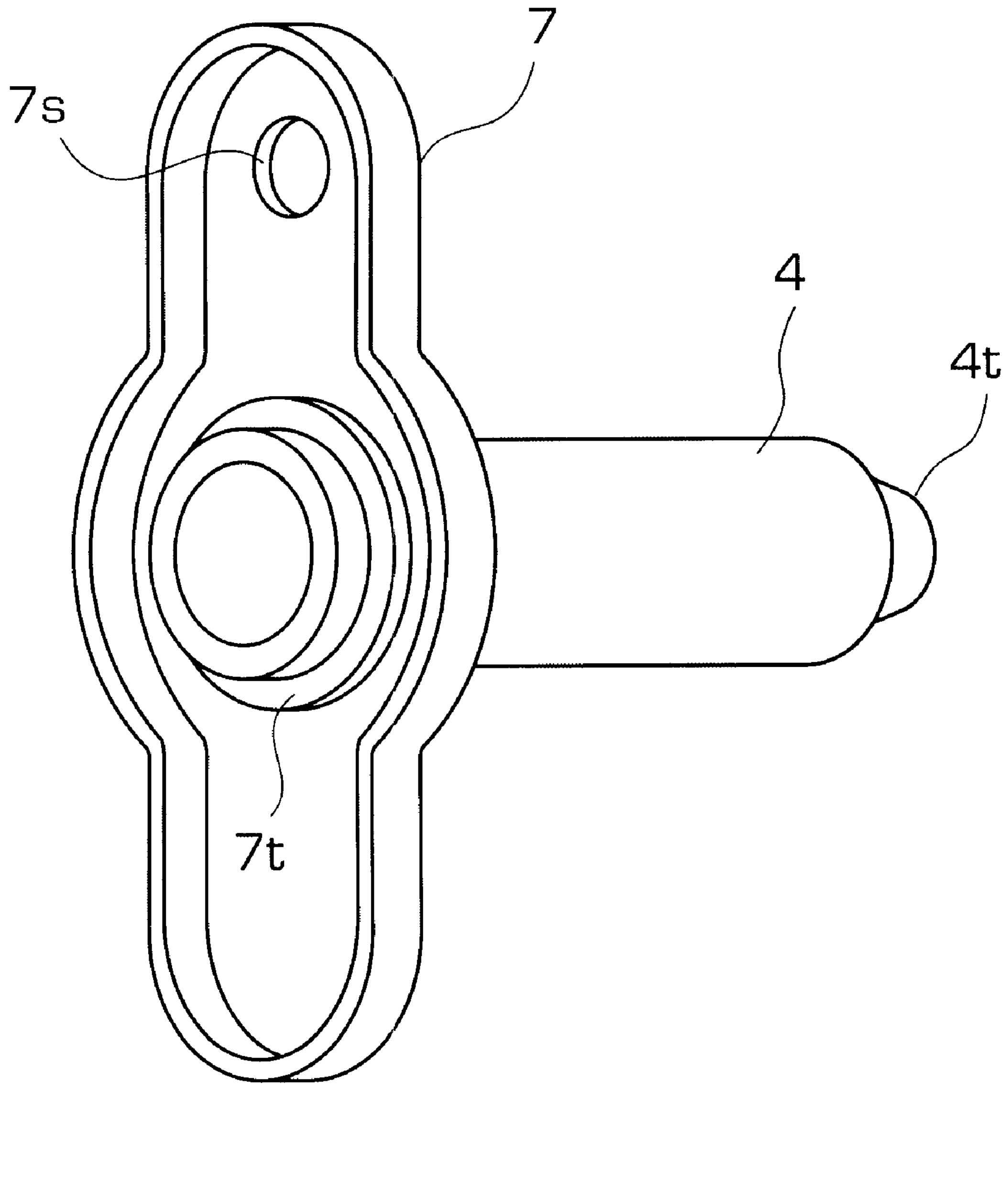
Figure 10:
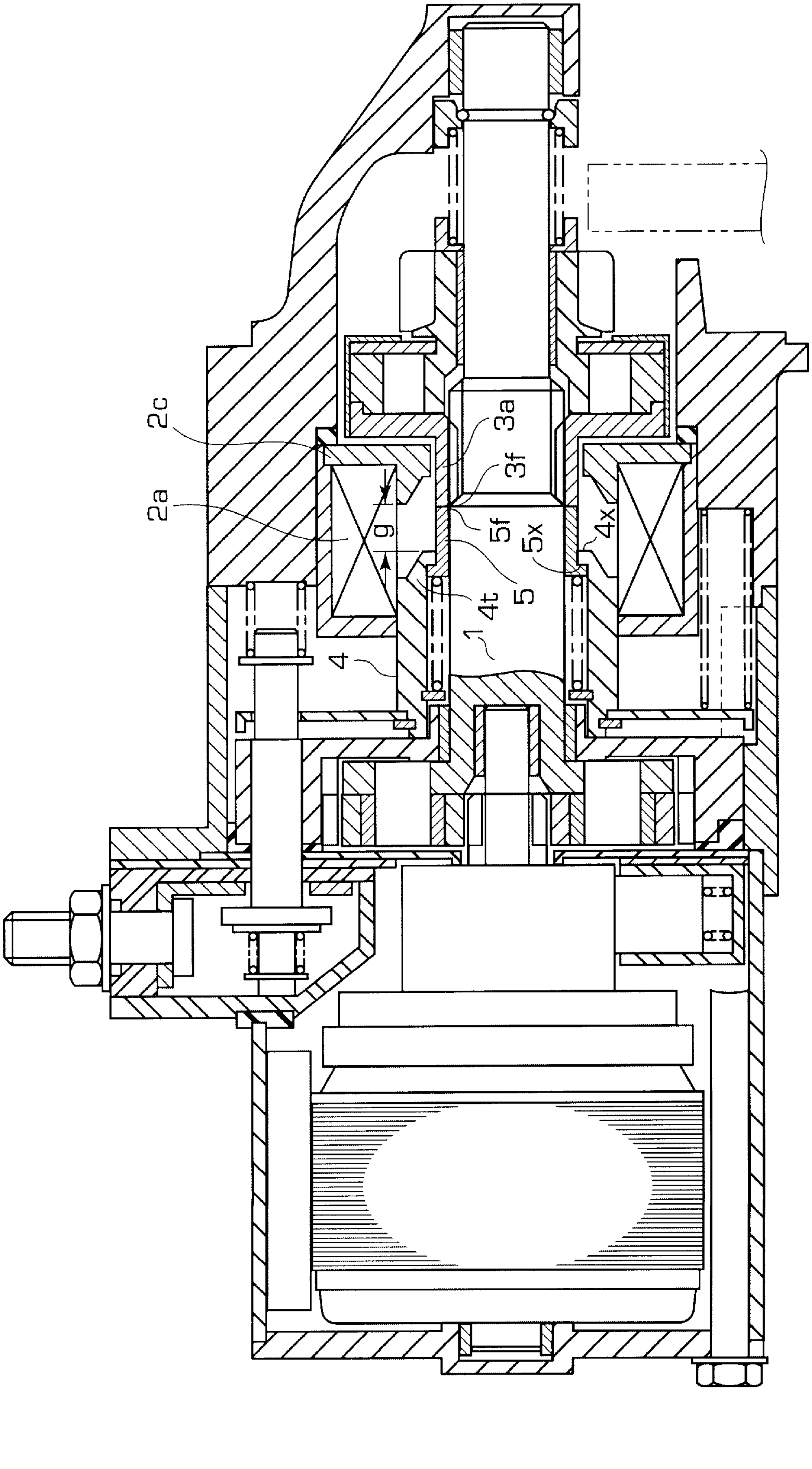
Figure 11:
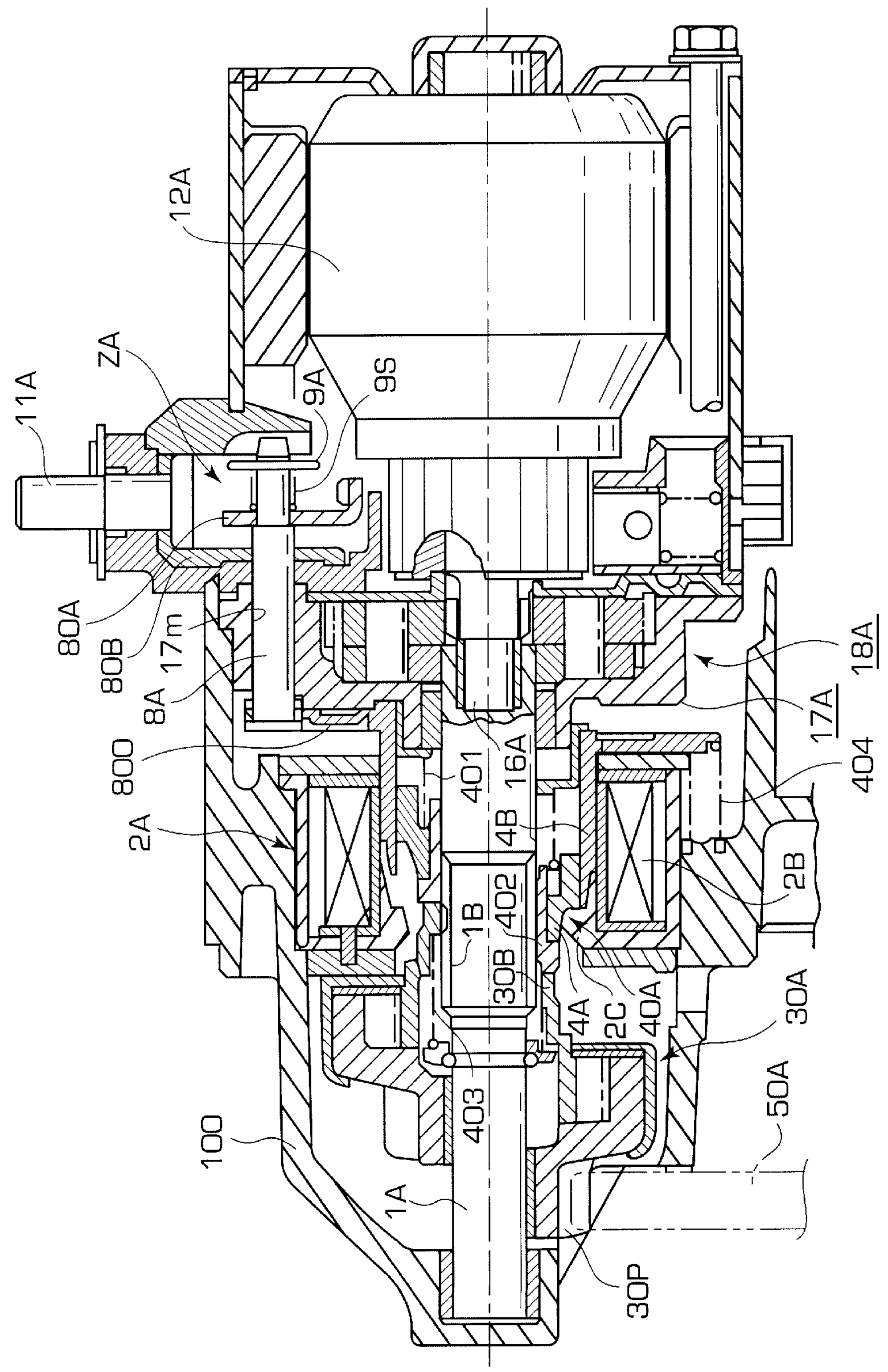
FIG. 11 PRIOR ART
Figure 12:
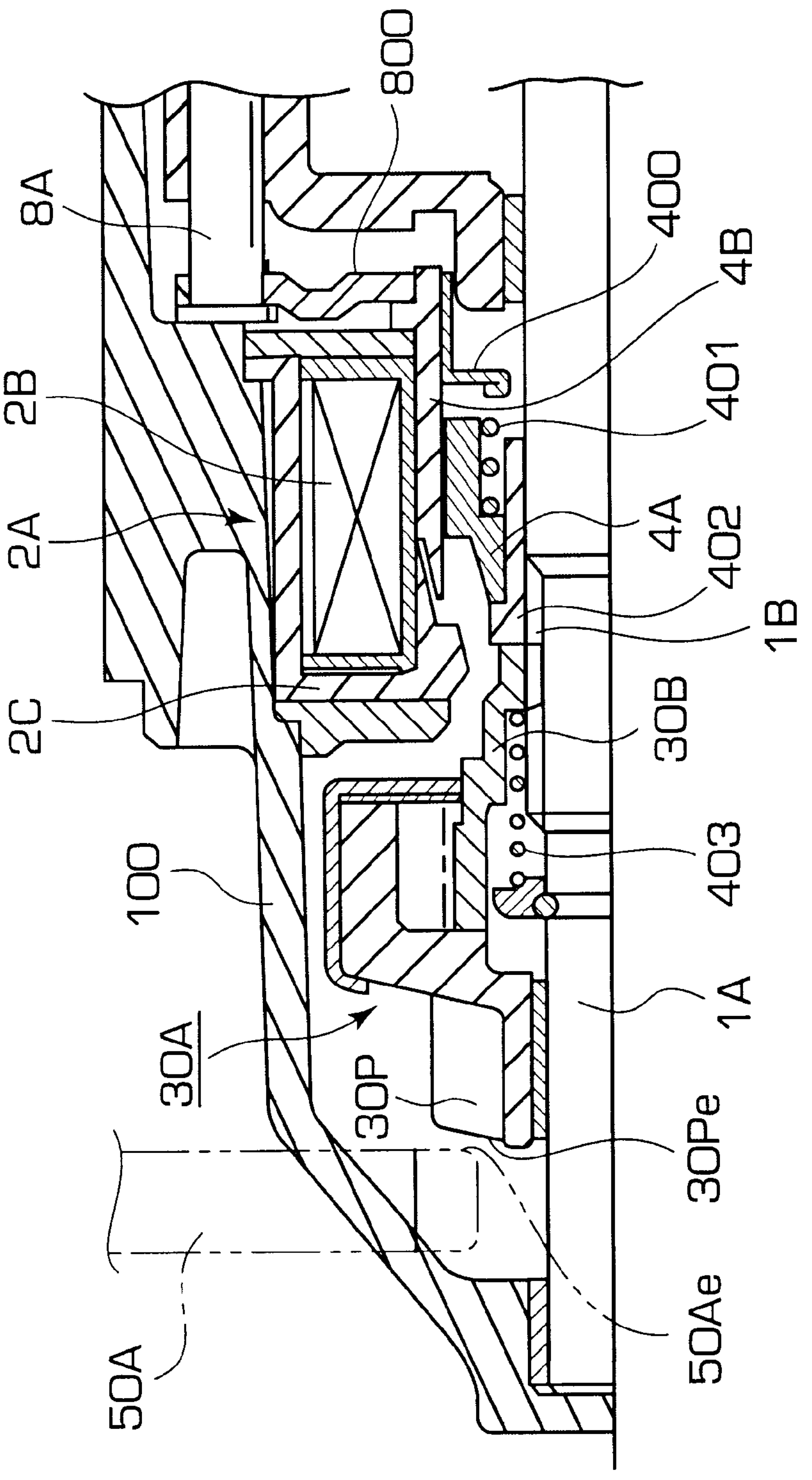
FIG. 12 PRIOR ART

FIG. 8(*a*) and (*b*) is a perspective view of the overrunning clutch;

FIG. 9 is a perspective view of a plunger and a shift plate;

FIG. 10 is a cross-sectional view showing the structure of the starter according to the other embodiment of the present invention;

FIG. 11 is a cross-sectional view showing one example of a conventional starter; and FIG. 12 is a partially enlarged view of FIG. 11.

DESCRIPTION OF THE PREFERRED EMBODIMENTS

1st Embodiment

A first embodiment of a starter according to the present invention will be explained hereunder with reference to the accompanying drawings.

Figure 1:
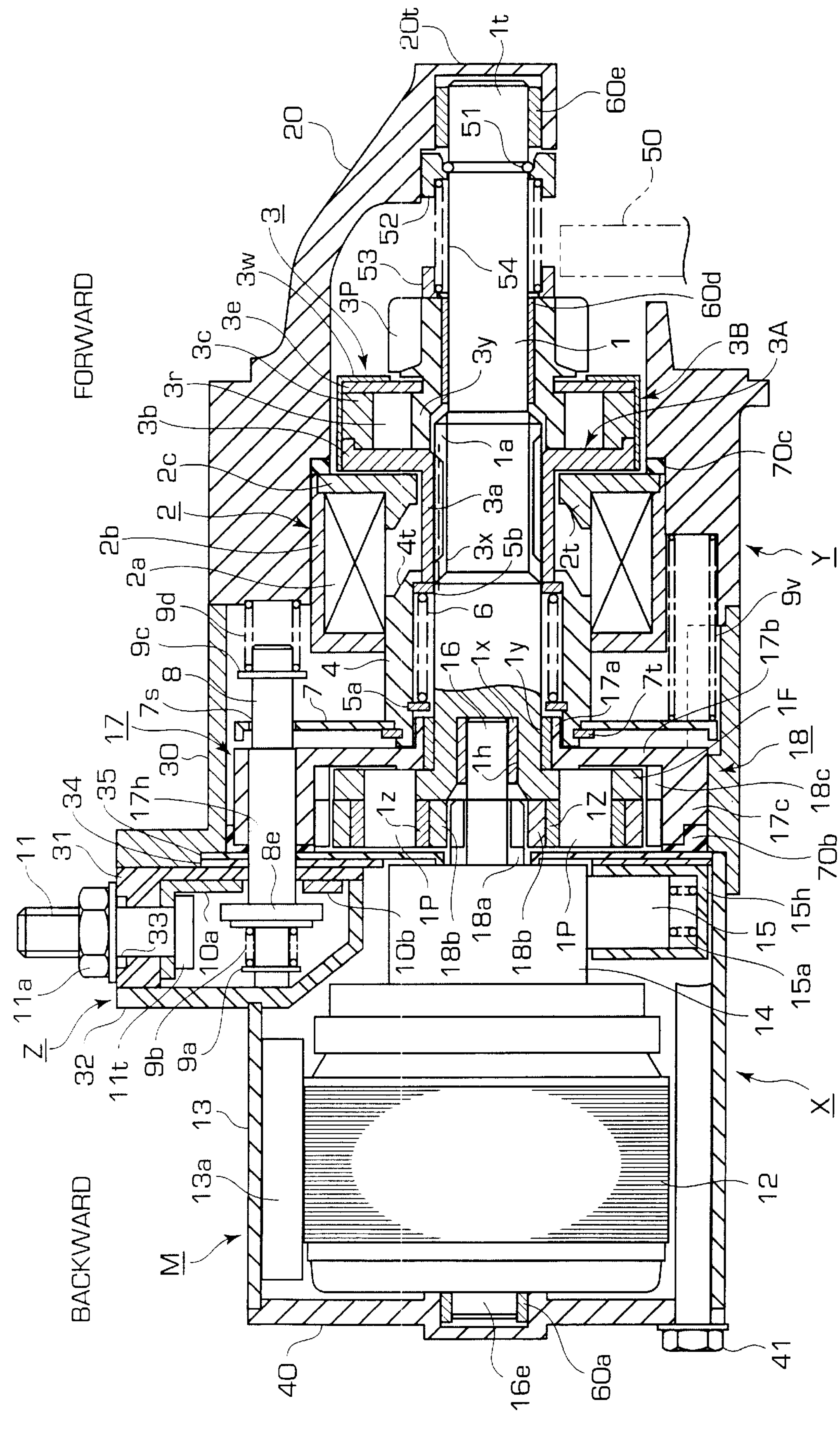
FIG. 1 is a cross-sectional view showing the structure of a starter according to a first embodiment of the present invention.

FIG. 1 is a cross-sectional view showing a structure of the starter according to the first embodiment.

The starter according to the first embodiment is covered by an outer wall member comprising a front bracket 20, a center bracket 30, and a rear bracket 40 and presents the substantially bullet-shaped external appearance. A section into which a ring gear 50 comes is an opening.

Inside the starter, there are arranged a DC motor M and an output shaft 1 driven by this DC motor M. Arranged around this output shaft 1 are an annular electromagnetic switch 2, an overrunning clutch 3, a plunger (a moving core) 4, etc.

In other words, the starter according to the first embodiment is a coaxial type starter with the electromagnetic switch 2, the overrunning clutch 3 and the plunger 4 coaxially arranged on the output shaft 1.

The starter structure according to the first embodiment will now be explained in detail.

In FIG. 1, the left side is a DC motor section X, the right side is an operating section Y, and the upper section of the substantially central side is a contact chamber Z, respectively. The motor section side of FIG. 1 is referred to as "the rear" and the ring gear side is referred to as "the front" in the following explanation for convenience.

As is well known, the DC motor M comprises an armature 12, a yoke 13 covering the periphery of this armature 12, a stationary magnetic pole 13*a* disposed inside this yoke 13, a commutator 14, brushes 15, and a shaft 16. The armature 12 is an armature core with an armature coil wound round it. The front side of the shaft 16 penetrates the cylindrical space of the commutator 14 of a cylindrical shape to be connected to a deceleration mechanism 18.

The armature coil is connected to the commutator 14. The DC motor M is available in 2-pole, 4-pole and 6-pole types depending on the number of the stationary magnetic poles. For instance, taking the case of using a 6-pole DC motor as a sample, a total of 6 units of the stationary magnetic pole 13*a* are provided by arranging a N-pole and a S-pole alternately. The brushes 15 kept in contact with the commutator 14 are arranged along the circumference of the commutator 14.

Reference numeral 15*a* is a spring for pushing the brushes 15 against the commutator 14. Numeral 15*h* denotes a brush holder.

The DC motor M described above drives an output shaft 1.

The operating section Y comprises a deceleration or reduction gear mechanism 18, the output shaft 1, an electromagnetic switch 2, an overrunning clutch 3, and a plunger 4. etc.

17 is an internal gear member. This comprises a first tubular portion 17*a* fitted to the outer circumference of the output shaft 1 through a bearing 1*y*, a hollow disk-shaped bottom plate portion 17*b* extending in the direction perpendicular to the outer circumference of the output shaft 1 from the first tubular portion 17*a*, and a second tubular portion 17*c* extending to the rear side from the outer circumference edge of the bottom plate portion 17*b* and having an internal gear 18*c* on the inner circumference.

The deceleration mechanism 18 comprises an internal gear 18*c* of the internal gear member 17, a sun gear 18*a* provided on the shaft 16, a plurality of planet gears 18*b* arranged around this sun gear 18*a* and adapted to engage with the sun gear 18*a* and the internal gear 18*c* respectively, and pins 1P projecting from a flange section 1F of the output shaft 1 inserted between the group of the planet gears 18*b* and the bottom plate portion 17*b* of the internal gear member 17 and connecting each planet gear 18*b* to the flange section 1F of the output shaft 1. The turning force of each planet gear 18*b* is transmitted to each pin 1*p* through a bearing 1*z*.

A round groove 1*h* is formed at the center of the flange portion 1F of the output shaft 1 and the forward end of the shaft 16 is rotatably supported through a bearing 1*x* provided in the round groove 1*h*.

Figure 5:
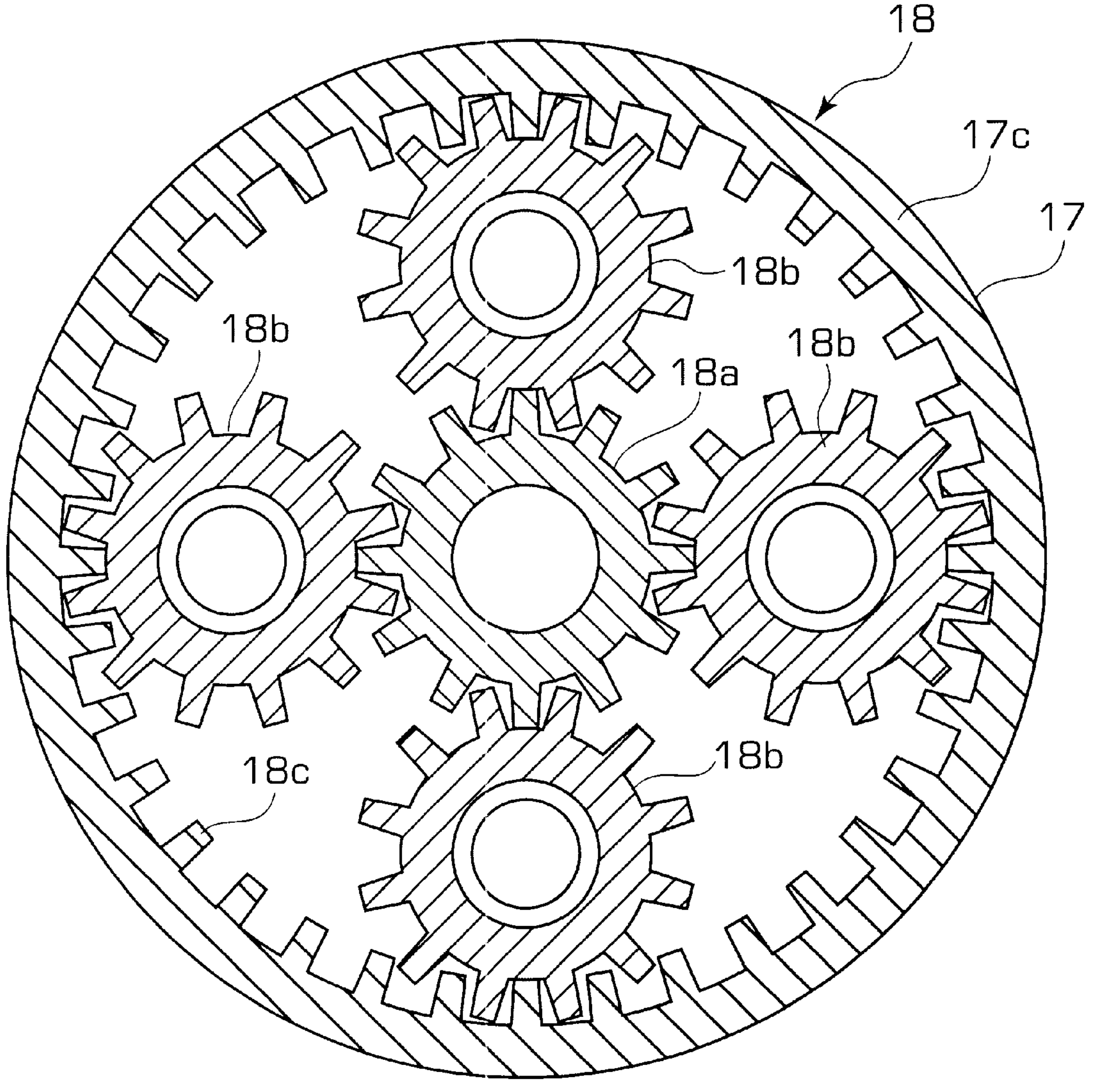
FIG. 5 is a cross-sectional view of a deceleration mechanism.

Accordingly, as shown in the cross-sectional view of FIG. 5, when each planet gear 18*b* moves around the sun gear 18*a*, the turning force of the shaft 16 is decelerated reduced and transmitted to the output shaft 1 through the pins 1P.

A helical spline 1*a* is formed on a part of the outer circumference at the central side of the output shaft 1. On the outer circumference of the part where this helical spline 1*a* is formed, the overrunning clutch 3 is arranged so that a tubular portion 3*a* of a thrust spline 3A corresponds thereto. Further, formed on the inner surface of the tubular portion 3*a* of the thrust spline 3A is a helical spline 3*x* adapted to engage with the helical spline 1*a*. That is, the overrunning clutch 3 is spline-connected to the output shaft 1.

The electromagnetic switch 2 is arranged on the outer circumference side of the tubular portion 3*a* of the thrust spline 3A.

The plunger 4 is arranged on the outer circumference of the flange 1F side in the output shaft 1.

The overrunning clutch 3 comprises the thrust spline 3A provided with a tubular portion 3*a* and a flange portion 3*b*, a roller cam 3*c*, a pinion 3P, an inner clutch 3*y*, a clutch roller 3*r* and a spring 3*s*, and a clutch cover 3*w*. The tubular portion 3*a* of the thrust spline 3A is provided on the inner surface thereof with the helical-spline 3*x* adapted to engage with the helical-spline 1*a* formed on a part of the outer circumference of the central side of the output shaft 1. The flange portion 3*b* is formed on the front side of the tubular portion 3*a* and serves as a cam bottom of the roller cam 3*c*. The roller cam 3*c* is kept in position between the flange portion 3*b* and a washer 3*e* of this thrust-spline 3A. The inner clutch 3*y* forms a tubular portion of the base of the pinion 3P. The clutch roller 3*r* and the spring 3*s* are disposed in a groove 3*t* formed on the roller cam 3*c*. The clutch cover 3*w* is arranged to cover the outside of the flange portion 3*b*, the roller cam 3*c* and the washer 3*e* of the thrust-spline 3A.

The thrust-spline 3A and the roller cam 3*c* form an outer clutch 3B.

Figure 6:
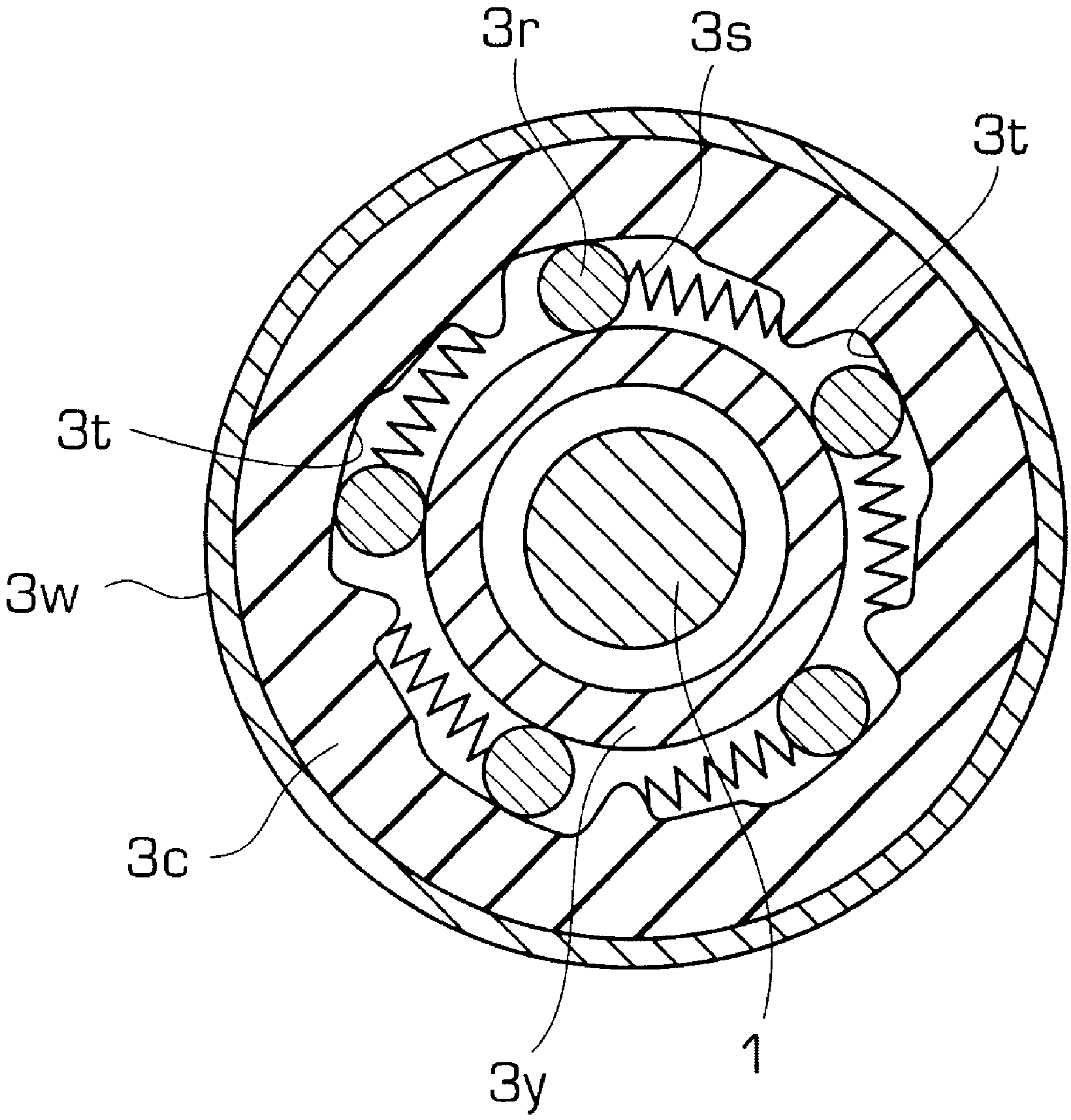
FIG. 6 is a cross-sectional view of an overrunning clutch.

The overrunning clutch 3 acts as a so-called one-way clutch. FIG. 6 shows a cross-sectional view of the overrunning clutch 3. Formed at several points of the inner circumference of the roller cam 3*c* are grooves 3*t* which form a narrow space and a wide space between the inner circumference of the roller cam 3*c* and the outer circumference of the inner clutch 3*y*. The clutch roller 3*r* is disposed in each groove 3*t*. 3*s* is the spring for energizing the clutch roller 3*r* toward the narrow space of the groove 3*t*.

When the output shaft 1 is driven by the DC motor M, the roller cam 3*c* is caused to rotate to move the clutch roller 3*r* toward the narrow space of the groove 3*t*. Then, the roller cam 3*c* of the outer clutch 3B engages with the inner clutch 3*y* to rotate the pinion 3P, which engages with a ring gear 50. Once the pinion 3*p* is taken around with the ring gear 50, the clutch roller 3*r* moves toward the wide space of the groove 3*t*, and the outer clutch 3B is disengaged from the inner clutch 3*y* to disconnect the overrunning clutch 3 from the engine.

The electromagnetic switch 2 comprises the exciting coil 2*a*, the switch case 2*b* for covering the exciting coil 2*a*, and the core 2*c*, and it is arranged at the rear side of the position of the overrunning clutch 3B. The core 2*c* has a hollow-shaped disc surface opposing the flange portion 3*b* of the thrust-spline 3A and is made in the annular body arranged so as to penetrate the outer circumference of the tubular portion 3*a* of the thrust-spline 3A. The core 2*c* also has annular projection 2*t* extending to the rear side of the tubular portion 3*a* side of the thrust-spline 3A.

The plunger 4 is made of a tubular body that is arranged in a movable manner between the inner circumference of the switch case 2*b* and the tubular portion 3*a* of the thrust-spline 3A. The front end 4*t* of the plunger 4 opposing the annular projection 2*t* of the core 2*c* is formed in a shape corresponding to that of the annular projection 2*t*.

An annular plate 5*a* serving as a first pressure plate is secured to the inner circumference of the rear end of the plunger 4. In addition, an annular plate 5*b* serving as a second pressure plate is provided on the side of the rear end of the tubular portion 3*a* of the thrust-spline 3A of the overrunning clutch 3. Arranged between these plates 5*a* and 5*b*, that is, arranged in a space between the inner circumference of the plunger 4 and the outer circumference of the output shaft 1 is a coil spring 6 serving as an elastic means.

Accordingly, the plunger 4 is attracted by the core 2*c* to move in the direction (forward) of the core 2*c*, and the overrunning clutch 3 is pushed by the plate 5*b* and moves as the plunger 4 moves. When the pinion 3P once stops moving after the end surface is brought into contact with the end surface of the ring gear 50, the motor is driven. When the crests and roots of the pinion 3P agree with those of the ring gear 50, the pinion 3P engages with the ring gear 50 by the elastic force of the coil spring 6 stored by compression.

8 is a contact shaft which is movably supported in the extended direction of the shaft by a supporting hole 17*h* provided on a part (the upper part of FIG. 1) of a second tubular portion 17*c* of the internal gear member 17. Further, the contact shaft 8 is mounted so as to extend over the operating section Y and the contact chamber Z through the supporting hole 17*h*.

Provided on one end of the contact shaft 8 situating in the contact chamber Z is a movable contact 8*e*. On the rear side of this movable contact 8*e*, an annular plate 9*a* is secured to the contact shaft 8, and there is provided a coil spring 9*b* for pushing the movable contact 8*e* toward the stationary contact (described later) side between the plate 9*a* and the movable contact 8*e*. On the other side of the contact shaft 8 situating on the side of the operating section Y, an annular plate 9*c* is secured to the contact shaft 8, and there is provided a return coil 9*d* between the plate 9*c* and the front bracket 20.

Further, a shift plate 7 is secured to the rear end of the plunger 4. This shift plate 7 is an elongated plate extending in the upper and lower directions. The shift plate 7 is provided on the central side with a hole into which the rear side of the plunger 4 is fitted and also provided on the upper portion with a through-hole 7*s* corresponding to the contact shaft 8. This shift plate 7 is secured to the plunger 4 by a retaining ring 7*t*. There is provided a return coil spring 9*v* between the lower section of the shift plate 7 and the front bracket 20.

The shift plate 7 secured to the plunger 4 and the plate 9*c* serving as a plate contacting portion form a contact shaft moving means.

Further, the coil spring 6, the annular plate 5*a* serving as the first pressure plate, and the annular plate 5*b* serving as the second pressure plate form an energizing means.

The DC motor section X, the contact chamber z and the operating section Y are divided by partition plates 34, 35.

Also, the contact chamber Z is divided by a contact chamber wall 31 and a contact chamber cover 32. The contact chamber wall 31 is provided with a first stationary contact 10*a* and a second stationary contact 10*b*.

The first stationary contact 10*a* is connected to a battery through a terminal bolt 11.

The second stationary contact 10*b* is connected to the positive pole brushes through a lead wire and is also connected to the other end of the exciting coil 2*a* of the electromagnetic switch 2.

In the state where the terminal bolt 11 is secured in potion by a nut 11*a*, the first stationary contact 10*a* is also secured to the contact chamber wall 31 by the bolt head 11*t*.

33 is an O-ring and 70*b* and 70*c* are packings.

A rear end 16*e* of the shaft 16 is rotatably supported on a rear bracket 40 through a bearing 60*a*, and a front end 1*t* of the output shaft 1 is supported on the tip 20*t* side of the front bracket 20 through a bearing 60*e*.

Provided on the front side of the output shaft 1 through an engaging ring 51 is a stopper 52. Also, a stopper 53 is provided on the tip of the pinion 3P. Between these stoppers 52 and 53, there is provided a return spring 54.

41 is a bolt for securing the DC motor section X and the operating section Y by holding them between the rear bracket 40 and the front bracket 20.

Figure 7:
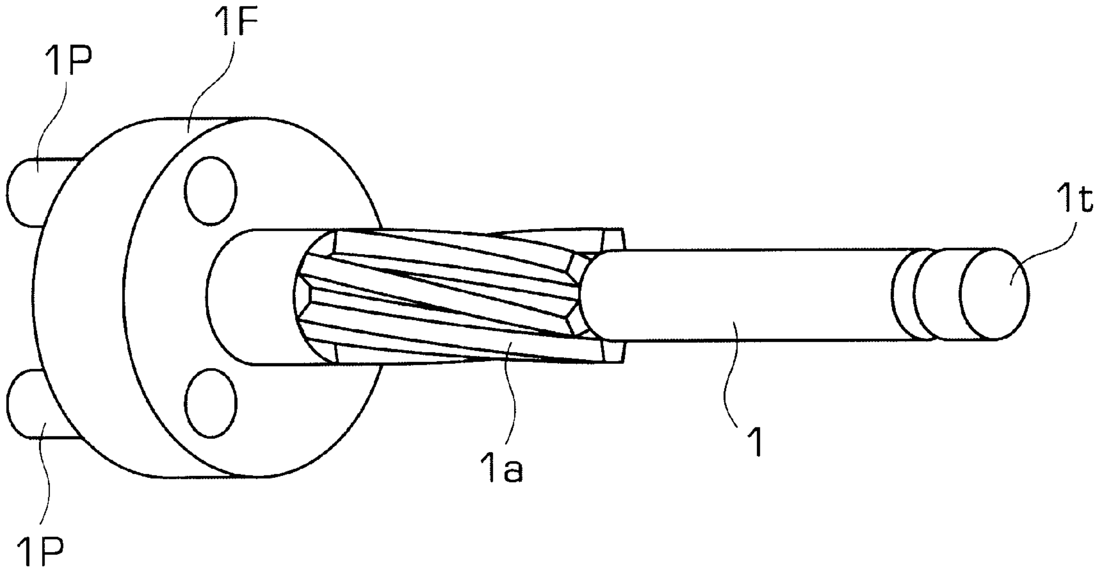
FIG. 7 is a perspective view of an output shaft.

FIG. 7 shows a perspective view of the output shaft 1, FIG. 8(*a*) and (*b*) show a perspective view of the overrunning clutch 3, and FIG. 9 shows a perspective view of the plunger 4 and shift plate 7, respectively.

Next, the operation will be described.

Figure 2:
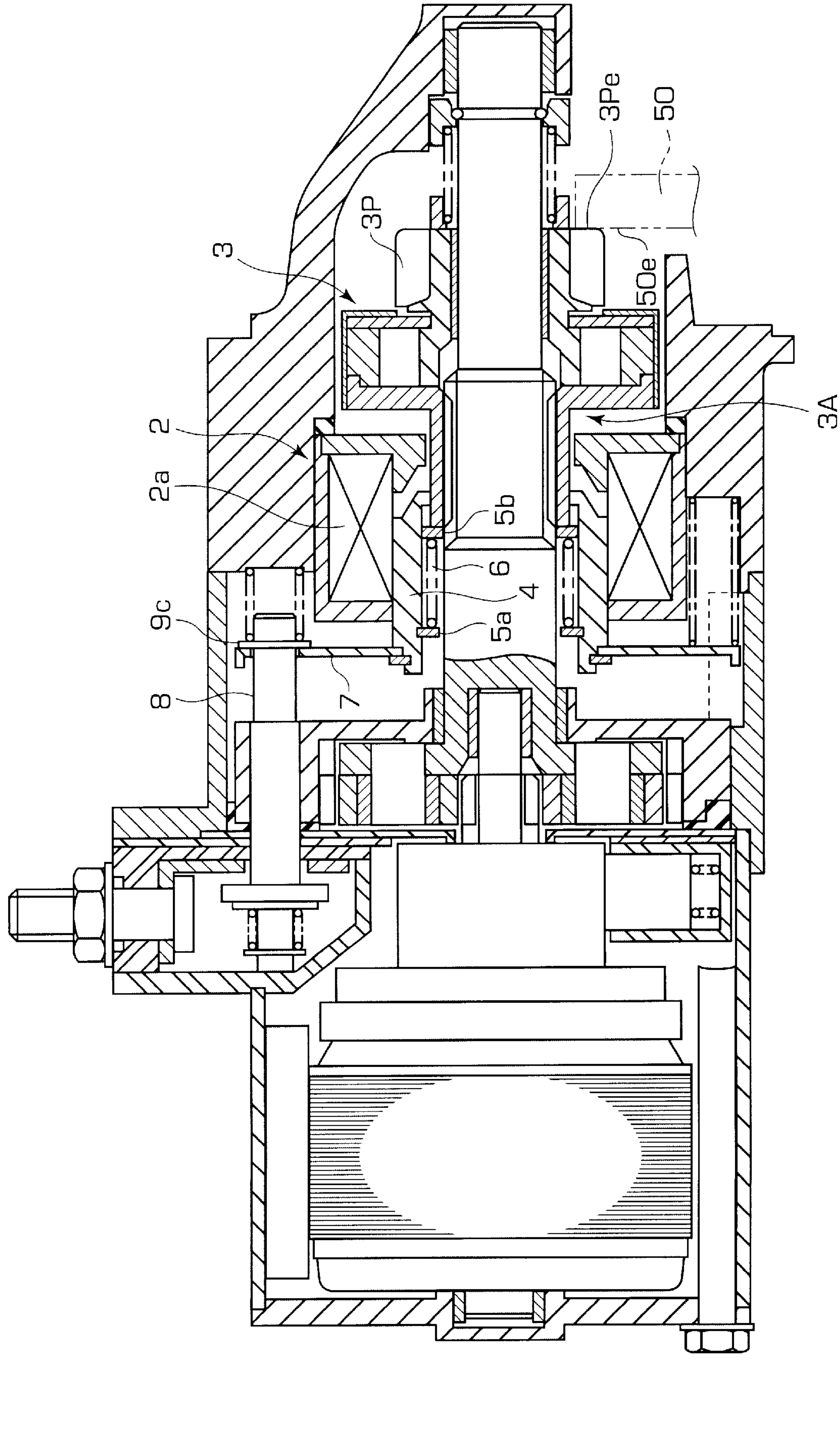
FIG. 2 is a cross-sectional view explaining operation of the starter according to the first embodiment.

When the ignition switch is turned ON and current flows to the exciting coil 2*a* of the electromagnetic switch 2, the plunger 4 is attracted toward the exciting core 2*c*. As a result, as shown in FIG. 2, the plate 5*a* pushes the coil spring 6, and the plate 5*b* presses the thrust spline 3A to push the overrunning clutch 3 out toward the ring gear 50. As the end surface 3P*e* of the pinion 3P provided at the overrunning clutch 3 is brought into contact with the end surface 50*e* of the ring gear 50, the movement of the overrunning clutch 3 in the forward direction (the right direction of FIG. 2) stops for a while. However, while the plate 5*a* provided on the inner circumference side of the plunger 4 compresses the coil spring 6, the plunger 4 is further attracted and continues to move. The shift plate 7 also moves forward and contacts the plate 9*c*. FIG. 2 shows the state where the shift plate 7 contacts with the plate 9*c*.

Figure 3:
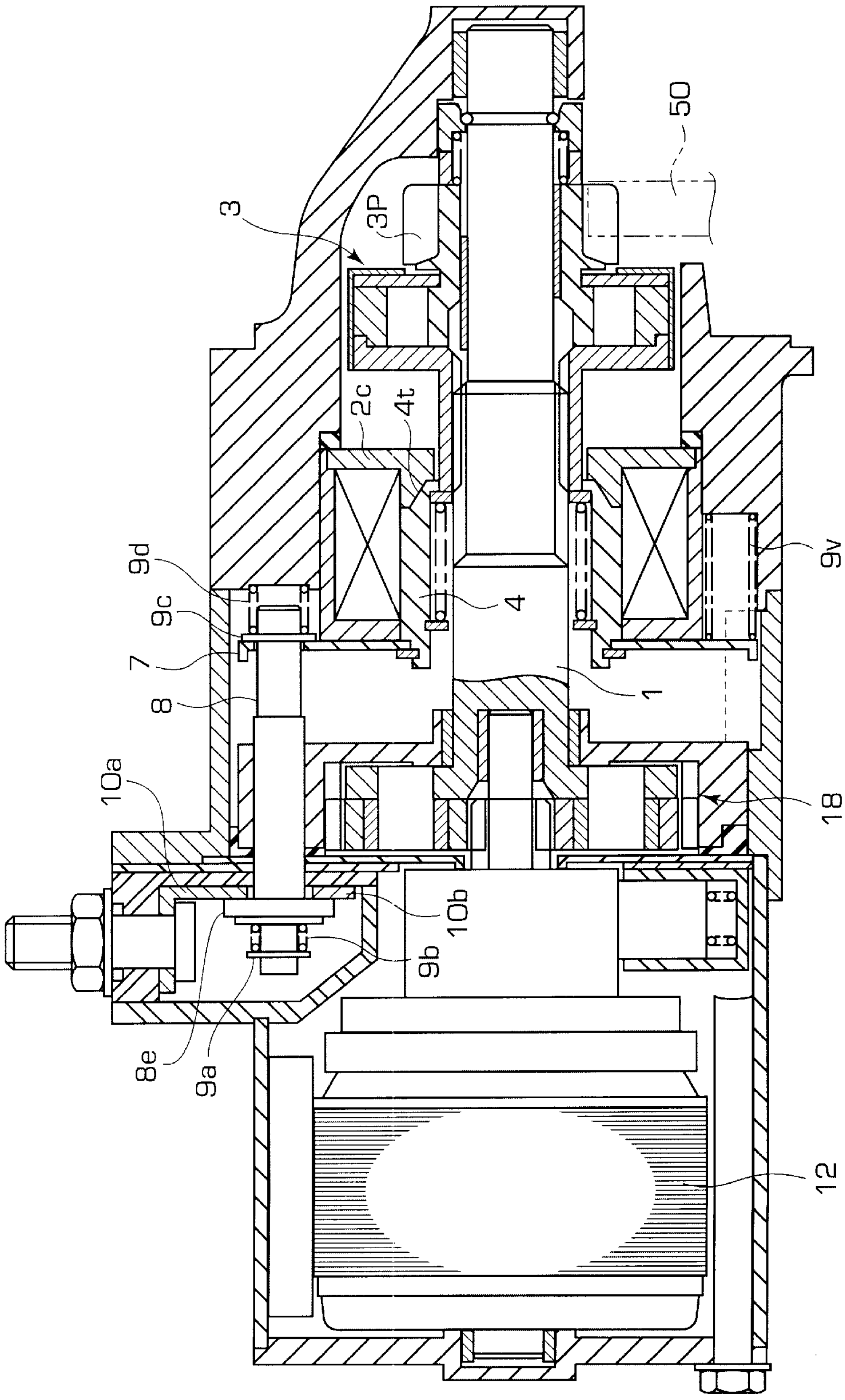
FIG. 3 is a cross-sectional view explaining operation of the starter according to the first embodiment.

After this state as shown in FIG. 2, the plunger 4 is continuously attracted and as shown in FIG. 3, the plate 9*c* secured to the contact shaft 8 is pushed by the shiftplate 7 to cause the contact shaft 8 to move forward. As a result, when the moving contact 8*e* of the contact shaft 8 is brought into contact with the first and second stationary contacts 10*a* and 10*b*, electric power is supplied from a battery and the armature 12 begins to rotate.

The contact shaft 8 continuously moves until the plunger 4 is completely attracted and its front end 4*t* is brought into contact with the exciting core 2*c*. At this time, the coil spring 9*b* is compressed by the plate 9*a* and thus, the moving contact 8*e* is pressed and kept in contact with the first and second stationary contacts 10*a* and 10*b*.

When the armature 12 begins to rotate, the rotational force is decelerated through the deceleration mechanism 18 and is transmitted to the output shaft 1, the overrunning clutch 3 that is spline-connected to the output shaft 1, and further to the pinion 3P. Then, when the pinion 3P turns slowly and the crests and roots of the pinion 3P agree with those of the ring gear, the pinion 3P is pushed forward by the spring force (the elastic force) of the compressed coil spring 6 and completely engages with the ring gear 50. Thus, as a crankshaft connected to the ring gear 50 turns, the engine is started.

The final state is shown in FIG. 3.

When the engine is started, the output shaft 1 is separated from the pinion 3P by the action of the overrunning clutch 3 and the pinion 3P runs idle. Then, when the power supply to the exciting coil 2*a* is stopped, the pinion 3P is disengaged from the ring gear 50 as the plunger 4 and the overrunning clutch 3 are returned to their original positions by the return coil springs 9*d*, 9*v* and 54.

Further, when the crests and roots of the pinion 3P agree with those of the ring gear 50, they engage with one another without causing the end surface 3P*e* of the pinion 3P to contact with the end surface 50*e* of the ring gear 50. Therefore, no problem is caused.

According to the first embodiment, before the rotation of the armature 12 is started, the end surface 3P*e* of the pinion 3P is brought into contact with the end surface 50*e* of the ring gear 50 in advance by the elastic force of the coil spring 6. Then, the armature 12 is caused to rotate and the pinion 3P is driven to engage with the ring gear 50 by the elastic force of the coil spring 6 and as a result, the pinion 3P is held in position and is not rebounded.

When the pinion 3P engages with the ring gear 50, the pinion 3P is not rebounded and does not have to spring into the ring gear 50. It is therefore possible to cause the pinion 3P to smoothly engage with the ring gear 50 and improve the reliability at the time of engagement of the pinion 3P with the ring gear 50. It is also possible to reduce the wearing of the gears and extend the life span thereof.

Also, since the moving amount of the contact shaft 8 is arranged to be smaller than that of the plunger 4, it is possible to make the contact chamber Z smaller, that is, the starter can be smaller in size.

In other words, as seen in the conventional starter, if it has such a structure that the contact shaft moves as long as the plunger does, it is necessary to secure a larger space between the moving contact and the stationary contact when the armature is caused to rotate in the state where the pinion is brought into contact with the ring gear in advance as shown in the first embodiment. Since it is also necessary to secure a moving space for the plate (retaining ring etc.) for holding the spring adapted to push the moving contact, the contact chamber according to the conventional starter must be larger in size.

As compared with this, according to the starter with the structure shown in the first embodiment, in addition to the effects described above, it is possible to reduce the moving amount of the contact shaft 8 to make the contact chamber smaller. In other words, it is possible to make the starter itself smaller.

$2^{nd}$ Embodiment

Further, when there is provided a larger clearance between the supporting hole 17*h* formed on the internal gear member 17 and the contact shaft 8, the contact shaft 8 becomes loose during its sliding movement to make the contact of the moving contact 8*e* with the first and second stationary contacts 10*a* and 10*b* imperfect. There is also the possibility that any adhesion of wearing powder (dust) of the contact chamber wall 31 generated from the imperfect contact to a contact may cause contact failure and the electric power does not flow. Accordingly, it is necessary to prevent the contact shaft 8 from inclining during its sliding movement, but on the contrary, to make the sliding movement of the contact shaft 8 smooth, when the clearance between the supporting hole 17*h* and the contact shaft 8 is made too small, even a small unbalanced load causes the internal wall of the supporting hole 17*h* to interfere with the contact shaft 8 and it may cause further wear therebetween.

Figure 4:
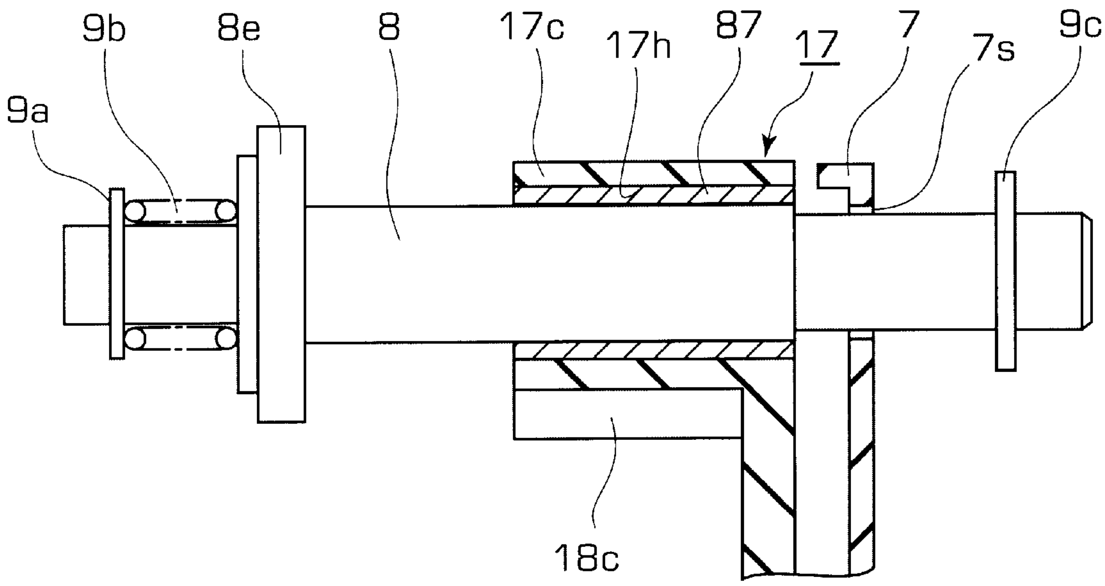
FIG. 4 is a partially cross-sectional view showing the structure of the starter according to a second embodiment.

Also, when the internal gear member 17 uses the same material as the contact shaft 8 (e.g. iron versus iron, resin versus resin, etc.), there is the possibility that burning or melting loss is caused. To prevent these problems, as shown in FIG. 4, there is provided a bearing 87 made of different material from the contact shaft 8 on the sliding surface (internal wall) of the supporting hole 17*h* formed on the internal gear member 17 for supporting the contact shaft 8.

By means of this bearing 87, it is not only possible to make the sliding movement of the contact shaft 8 smoother to prevent the possible wear, but to make the contact of the moving contact 8*e* with the stationary contact 10*a* and 10*b* perfect (uniform). Also, as there is provided the bearing 87 made of different material from the contact shaft 8, seizure or melting loss can be removed.

Various kinds of springs as described above may be an elastic means such as the rubber that can store the elastic force therein.

In the first and second embodiments, the contact shaft 8 is supported by the supporting hole 17*h* provided on the internal gear member 17, but it may also be possible to support the contact shaft 8 by the center bracket 30 by providing the center bracket 30 serving as an outer wall with a supporting section with a supporting hole formed for supporting the contact shaft 8.

Further, it may be possible to use a cylindrical member 5 in place of the plate 5*b* as shown in FIG. 10.

In this case, the plunger 4 is provided at its end 4*t* with a first retaining portion 4*x* projecting toward the output shaft 1, while the cylindrical member 5 is provided at its other end with a second retaining portion 5*x* adapted to engage with the first retaining portion 4*x*. Thus, the cylindrical member 5 is arranged in a state where one end 5*f* thereof contacts with one end 3*f* of the thrust spline 3A and in a state where the other end is engaged at its second retaining portion 5*x* with the first retaining portion 4*x*.

Further, the overrunning clutch 3 is arranged so that the rear end 3*f* (of a cylindrical portion 3*a*) of the thrust spline 3A can be situated with a predetermined space g left between the rear end itself 3*f* and the end 4*t* of the plunger 4 facing the exciting core 2*c*, in a state where the plunger 4 is not excited by the exciting coil 2*a*.

The cylindrical member 5 is made of non-magnetic material or material of low magnetic permeability and arranged to cover the outer circumference of the output shaft 1 corresponding to the predetermined space g.

In such arrangement, when the exciting coil 2*a* is excited, it is possible to reduce the magnetic flux leaking to the output shaft 1 and the cylindrical portion 3*a* of the thrust spline 3A and also improve the attraction force to the plunger 4.

As described above, according to the present invention, there is provided the contact shaft moving means for moving the contact shaft in a direction to cause the moving contact to contact with the stationary contact after the plunger is attracted and moved only for a certain period of time. It is therefore possible to cause the pinion to smoothly engage with the ring gear, improve the engaging reliability of the pinion with the ring gear. It is also possible to reduce the wearing of the gear and extend the life span thereof. Further, since the contact chamber can be made smaller, it is possible to make the starter small in size.

There is also provided the energizing means for causing the pinion to engage with the ring gear by the elastic force after the end surface of the pinion contacts with the end surface of the ring gear. It is therefore possible to cause the pinion to engage with the ring gear more smoothly by the energizing means than before.

Further, the contact shaft is supported on the supporting hole formed on the internal gear member forming the deceleration mechanism for decelerating the rotation of the motor shaft and transmitting the decelerated turning force to the output shaft or on the outer wall member of the starter, through the bearing made of different material from the contact shaft. It is therefore possible to make the sliding movement of the contact shaft smoother. In addition to each effect described above, it is not only possible to prevent wearing, but to make the contact of the moving contact with the stationary contact perfect (uniform) and prevent the burning or melting loss.

What is claimed is:

1. A starter comprising:

an output shaft (1) driven by an electric motor (M);

a plunger (4);

an exciting coil (2*a*) for attracting the plunger;

an overrunning clutch (3) having a pinion (3P) for engaging with a ring gear (50) and spline-connected to the output shaft; the plunger, the exciting coil and the overrunning clutch being arranged on the outer circumference of and coaxially arranged on the output shaft;

a contact shaft (8) provided on one end thereof with a moving contact (8*e*) for contacting with a stationary contact (10*a*, 10*b*) so that electric power can be supplied to the motor, and arranged substantially parallel with the plunger; and means for reducing wear of said pinion and said ring gear by causing facing end surfaces of said pinion and said ring gear to contact each other, said wear reducing means comprising a contact shaft moving means for moving the contact shaft such that the moving contact is brought into contact with the stationary contact to supply power to the motor only after the plunger has been attracted and moved for a sufficient distance by the exciting coil to establish contact between the pinion and the ring gear.

2. A starter according to claim 1, wherein said wear reducing means causes the pinion to fully engage with the ring gear by elastic force when an end surface of the pinion is brought into contact with an end surface of the ring gear and a plurality of crests and a plurality of roots of the pinion agree with a plurality of crests and a plurality of roots of the ring gear.

3. A starter according to claim 2, wherein the contact shaft moving means comprises a shift plate secured to the plunger and provided with a through-hole for passing the other end of the contact shaft therethrough, and a shift plate contacting portion provided on the other side of the contact shaft and arranged to contact with the shift plate when the shift plate moves only for said certain period of time as the plunger is attracted and moved, and to move the contact shaft by the movement of the shift plate as the plunger is further attracted and moved, thereby causing the moving contact to contact with the stationary contact.

4. A starter according to claim 3, wherein the wear reducing means comprises an elastic means arranged in a space between the inner circumference of the plunger and the outer circumference of the output shaft, a first pressure plate secured to the inner circumference of the plunger and adapted to apply pressing force to one end of the elastic means as the plunger is attracted and moved, and a second pressure plate arranged on the other end of the elastic means and adapted to transmit the elastic force stored in the elastic means as a result of pressing by the first pressure plate to the overrunning clutch, thereby causing the pinion to engage with the ring gear.

5. A starter according to claim 4, wherein the contact shaft moving means is arranged to cause the moving contact of the contact shaft in contact with the stationary contact after the end surface of the pinion is brought into contact with the end surface of the ring gear by the wear reducing means as the plunger is attracted and moved only for a certain period of time.

6. A starter according to claim 3, wherein the contact shaft moving means is arranged to cause the moving contact of the contact shaft to contact with the stationary contact after the end surface of the pinion is brought into contact with the end surface of the ring gear by the wear reducing means as the plunger is attracted and moved only for a certain period of time.

7. A starter according to claim 2, wherein the wear reducing means comprises an elastic means arranged in a space between the inner circumference of the plunger and the outer circumference of the output shaft, a first pressure plate secured to the inner circumference of the plunger and adapted to apply pressing force to one end of the elastic means as the plunger is attracted and moved, and a second pressure plate arranged on the other end of the elastic means and adapted to transmit the elastic force stored in the elastic means as a result of pressing by the first pressure plate to the overrunning clutch, thereby causing the pinion to engage with the ring gear.

8. A starter according to claim 2, wherein the contact shaft moving means is arranged to cause the moving contact of the contact shaft in contact with the stationary contact after the end surface of the pinion is brought into contact with the end surface of the ring gear by the wear reducing means as the plunger is attracted and moved only for a certain period of time.

9. A starter according to claim 2, wherein the contact shaft is supported, through a bearing made of different material from the contact shaft, on a supporting hole provided on an internal gear member forming a deceleration mechanism for decelerating the rotation of the shaft of the motor and transmitting the decelerated force to the output shaft or on an outer wall member of the starter.

10. A starter according to claim 1, wherein the contact shaft moving means comprises a shift plate secured to the plunger and provided with a through-hole for passing the other end of the contact shaft therethrough, and a shift plate contacting portion provided on the other side of the contact shaft and arranged to contact with the shift plate when the shift plate moves only for said certain period of time as the plunger is attracted and moved, and to move the contact shaft by the movement of the shift plate as the plunger is further attracted and moved, thereby causing the moving contact to contact with the stationary contact.

11. A starter according to claim 10, wherein the contact shaft is supported, through a bearing made of different material from the contact shaft, on a supporting hole provided on an internal gear member forming a deceleration mechanism for decelerating the rotation of the shaft of the motor and transmitting the decelerated force to the output shaft or on an outer wall member of the starter.

12. A starter according to claim 1, wherein the contact shaft is supported, through a bearing made of different material from the contact shaft, on a supporting hole provided on an internal gear member forming a deceleration mechanism for decelerating the rotation of the shaft of the motor and transmitting the decelerated force to the output shaft or on an outer wall member of the starter.

13. A starter with a means for reducing the wear of a pinion (3P) and a ring gear (50), said means comprising:

a plunger (4) movably positioned in said starter;

a coil spring (6) positioned proximate said plunger;

a first pressure plate (5*a*) integral with said plunger and disposed on a first end of said coil spring;

a second pressure plate (5*b*) disposed on a second end of said coil spring;

an electromagnetic switch (2) including an exciting coil (2*a*) and an exciting core (2*c*) for inducing movement of said plunger;

an overrunning clutch (3) integral with said pinion; and a thrust-spline (3A) for pushing said overrunning clutch and said pinion into abutment with said ring gear;

wherein an ignition switch energizes the exciting coil which induces movement of the plunger, the first pressure plate integral with the plunger applies pressure to said coil spring and forces the second pressure plate into contact with the thrust-spline, said thrust-spline then pushes the overrunning clutch and pinion into abutment with the ring gear prior to supplying power to a starter motor.

* * * * *